United States Patent
Unno (10) Patent No.: US 9,347,853 B2
(45) Date of Patent: May 24, 2016

(54) METHOD AND DEVICE OF MEASURING WAVEFRONT ABERRATION, METHOD OF MANUFACTURING OPTICAL SYSTEM, AND RECORDING MEDIUM

(71) Applicant: CANON KABUSHIKI KAISHA, Tokyo (JP)

(72) Inventor: Yasuyuki Unno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 14/081,548

(22) Filed: Nov. 15, 2013

(65) Prior Publication Data

US 2014/0139825 A1 May 22, 2014

(30) Foreign Application Priority Data

Nov. 19, 2012 (JP) .................................. 2012-253307

(51) Int. Cl.
*G01M 11/02* (2006.01)
(52) U.S. Cl.
CPC ...... *G01M 11/0257* (2013.01); *G01M 11/0242* (2013.01)
(58) Field of Classification Search
None
See application file for complete search history.

(56) References Cited

U.S. PATENT DOCUMENTS

| | | | | |
|---|---|---|---|---|
| 8,243,157 | B2 * | 8/2012 | Ng ....................... | G02B 3/0056 348/222.1 |
| 8,358,367 | B2 * | 1/2013 | Ng ..................... | G02B 27/0075 348/349 |
| 9,091,614 | B2 * | 7/2015 | Ohkubo ............ | G01M 11/0257 |
| 9,170,171 | B2 * | 10/2015 | Unno ................ | G01M 11/0257 |
| 2004/0227932 | A1 * | 11/2004 | Yoon .............................. | 356/121 |
| 2009/0152453 | A1 * | 6/2009 | Li et al. .......................... | 250/235 |
| 2015/0073752 | A1 * | 3/2015 | Ohkubo .................... | G01J 9/00 702/189 |

FOREIGN PATENT DOCUMENTS

| | | |
|---|---|---|
| JP | 2004-061238 A | 2/2004 |
| JP | 2004-317376 A | 11/2004 |
| WO | WO 03051189 A2 * | 6/2003 |

OTHER PUBLICATIONS

Lindlein, Norbert et al., "Algorithm for expanding the dynamic range of a Shack-Hartmann sensor by using a spatial light moduclator array," May 2001, Optical Engineering, vol. 4, No. 5, pp. 837-840.*

\* cited by examiner

*Primary Examiner* — Gordon J Stock, Jr.
(74) *Attorney, Agent, or Firm* — Canon USA Inc. IP Division (57) ABSTRACT

A wavefront aberration measuring method forms a plurality of spot images by causing light, which is transmitted through a test optical system, to be incident on a lenslet array, and measures positions of the spot images. Based on the measured positions of the spot images, a wavefront aberration of the test optical system is calculated. When the positions of the spot images are measured, at least one lenslet forming the lenslet array is shielded from light, and the spot images are measured.

16 Claims, 8 Drawing Sheets

METHOD AND DEVICE OF MEASURING WAVEFRONT ABERRATION, METHOD OF MANUFACTURING OPTICAL SYSTEM, AND RECORDING MEDIUM

BACKGROUND OF THE INVENTION

1. Field of the Invention

The present disclosure generally relates to optics and, more particularly, to a wavefront aberration measuring method and a wavefront aberration measuring device that measure wavefront aberrations of optical systems. In particular, the wavefront aberration measuring method and the wavefront aberration measuring device may be used for measurement of a wavefront aberration of an optical system when the optical system has a large wavefront aberration.

2. Description of the Related Art

The Shack-Hartmann method is known as a method of measuring a wavefront aberration of an optical system. The Shack-Hartmann method forms a plurality of spot images by causing light, which is transmitted through a test optical system, to be incident on a lenslet array, reconfigures a transmitted wavefront of the test optical system based on the positions of the plurality of spot images, and hence measures a wavefront aberration.

However, if an optical system having a large aberration is measured by the Shack-Hartmann method, a distortion and a shift may be generated at a spot image in a peripheral portion of a light receiving element, and position information of the spot image may not be correctly obtained. If a wavefront aberration is calculated on the basis of the incorrect position information, measurement accuracy may be decreased.

Regarding the problems, Japanese Patent Laid-Open No. 2004-317376 discloses a method of not using position information of a spot image formed in the outermost peripheral portion of a light receiving element when a wavefront is reconfigured. Also, Japanese Patent Laid-Open No. 2004-61238 discloses a method of not using position information of a spot image when a wavefront is reconfigured if a displacement amount of the position of the spot image with reference to a predetermined reference position exceeds a predetermined value.

However, with the wavefront aberration methods of any of Japanese Patent Laid-Open No. 2004-317376 and No. 2004-61238, the position information of the spot image formed in the peripheral portion of the light receiving element is not used although the position information is particularly important for calculating a large wavefront aberration. Hence, measurement accuracy for a wavefront aberration is not sufficient. Also, since the position information of the spot image used when the wavefront is reconfigured is decreased, the measurement accuracy for a wavefront aberration is decreased.

To accurately measure the wavefront aberration of the test optical system having a large wavefront aberration, the position information of the spot image formed in the peripheral portion of the light receiving element has to be accurately detected.

SUMMARY OF THE INVENTION

Accordingly, the present disclosure provides a wavefront aberration measuring method that can highly accurately measure a wavefront aberration of a test optical system having a large aberration, and a wavefront aberration measuring device optimal for the wavefront aberration measuring method. Also, the disclosure provides a method of manufacturing an optical system using the wavefront aberration measuring device, and a recording medium storing a program using the wavefront aberration measuring device.

A wavefront aberration measuring method according to an aspect of the disclosure includes measuring a wavefront aberration of a test optical system, by causing light, which is emitted from a light source and transmitted through the test optical system, to be incident on a lenslet array; forming a spot image with light transmitted through each lenslet of the lenslet array; measuring positions of the spot images; and measuring positions of spot images formed with light transmitted through at least one lenslet included in the lenslet array with blocking light transmitted through at least one other lenslet included in the lenslet array.

A method of manufacturing an optical system according to another aspect of the disclosure includes a step of evaluating an optical characteristic of an optical system by using the above-described wavefront aberration measuring method.

A wavefront aberration measuring device according to still another aspect of the disclosure includes a light source; a lenslet array on which light, which is emitted from the light source and transmitted through a test optical system, is incident; a light receiving element configured to receive light transmitted through the lenslet array; a light shielding member configured to block at least part of light, which is transmitted through the lenslet array; a control unit configured to control a light shielding state of the light shielding member; and a calculation unit configured to detect a position of a spot image formed on the light receiving element, and calculate a wavefront aberration of the test optical system based on the position of the spot image, in which, when the calculation unit detects the position of the spot image, the control unit controls a light shielding state of the light shielding member so that the light shielding member blocks light, which is transmitted through at least one lenslet of the lenslet array.

A recording medium according to yet another aspect of the disclosure stores a program for causing a wavefront aberration measuring device to execute a method including a measuring step of causing light, which is emitted from a light source and transmitted through a test optical system, to be incident on a lenslet array, forming a spot image with light transmitted through at least one other lenslet included in the lenslet array with blocking light transmitted through at least one other lenslet included in the lenslet array, and measuring a position of the spot image; and a calculating step of calculating optical paths from positions of a plurality of the spot images toward the light source, specifying parameters of the test optical system when light rays from the positions of the plurality of spot images converge at the light source, and calculating a wavefront aberration of the test optical system corresponding to the parameters of the test optical system.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described below with reference to the drawings.

Measurement for Spot Image

First Embodiment

Figure 1:
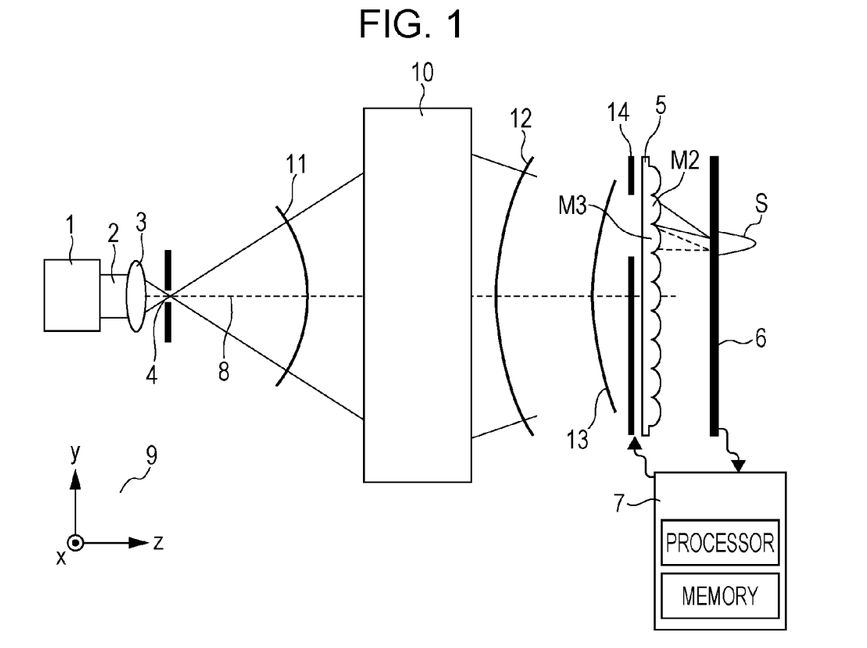
FIG. 1 is an explanatory illustration of a wavefront aberration measuring device according to an embodiment of the disclosure.

FIG. 1 is an explanatory illustration of a Shack-Hartmann wavefront aberration measuring device used for performing a wavefront aberration measuring method according to this embodiment. The wavefront aberration measuring device according to this embodiment includes a light source 1, a test optical system 10, a light shielding member (an aperture array 14), a lenslet array 5, and a light receiving element 6. Light, which is emitted from the light source 1 and transmitted through the test optical system 10, is incident on the lenslet array 5, and a spot image is formed on the light receiving element 6. A wavefront aberration can be measured on the basis of position information of the formed spot image.

The aperture array 14 has a plurality of apertures. The lenslet array 5 has a plurality of lenslets. There is a correspondence between an aperture and a lenslet. By controlling opening and closing of a specific aperture, it can be determined whether or not light, which is transmitted through the corresponding lenslet, is blocked.

An aperture uses, for example, a liquid crystal polarization element. If the transmissivity of the liquid crystal polarization element is adjusted by changing the orientation of liquid crystal, the liquid crystal polarization element functions as the light shielding member.

Alternatively, it can be controlled whether or not the light transmitted through the lenslet is blocked, even by using a light shielding plate having a specific opening and closing pattern, instead of the aperture array 14 having the plurality of apertures, opening and closing of which can be controlled, arranged therein.

In FIG. 1, light rays 2 emitted from the laser light source 1 are collected by a collective lens (condenser lens) 3. The laser light source is suitable as the light source; however, the light source may not be the laser light source. A center portion of the collected light rays is taken by a pinhole 4, and a point light source is formed at the position of the pinhole 4.

The optical axis 8 is determined with reference to the position of the pinhole 4 so that the optical axis 8 perpendicularly intersects with the test optical system 10. The test optical system 10, the aperture array 14, the lenslet array 5, and the light receiving element 6 are arranged so that the centers of these components are located on the optical axis 8.

An incident wavefront 11, which is a wavefront of light rays emitted from the pinhole 4 and being incident on the test optical system 10, is a wavefront of spherical waves. A transmitted wavefront 12, which is a wavefront of light rays transmitted through the test optical system 10, is a wavefront with a shape influenced by an aberration of the test optical system 10. If the test optical system 10 has a large wavefront aberration, the shape of the transmitted wavefront 12 is largely changed when the wavefront is transmitted through the test optical system 10 and then propagates to the lenslet array. The shape of the transmitted wavefront 12 becomes the shape of a transmitted wavefront 13 immediately before the wavefront is incident on the lenslet array 5. The transmitted wavefront 13 is incident on the lenslet array 5 including the plurality of lenslets (M1, M2, . . . , Mk, . . . ) and divided. In this case, by using the aperture array 14, the light can be blocked by each lenslet of the lenslet array 5. Referring to FIG. 1, the aperture array 14 is arranged between the test optical system 10 and the lenslet array 5. However, a similar advantage can be obtained even if the aperture array 14 is arranged between the lenslet array 5 and the light receiving element 6.

In FIG. 1, a spot image S is formed only with light transmitted through a lenslet M2, which is the second lenslet when being counted from above, and light transmitted through a lenslet M3, which is the third lenslet. In this case, if the aberration of the transmitted wavefront 13 is large, the light rays transmitted through the adjacent lenslets M2 and M3 interfere with each other, and spot images to be formed are deformed.

Figure 2:
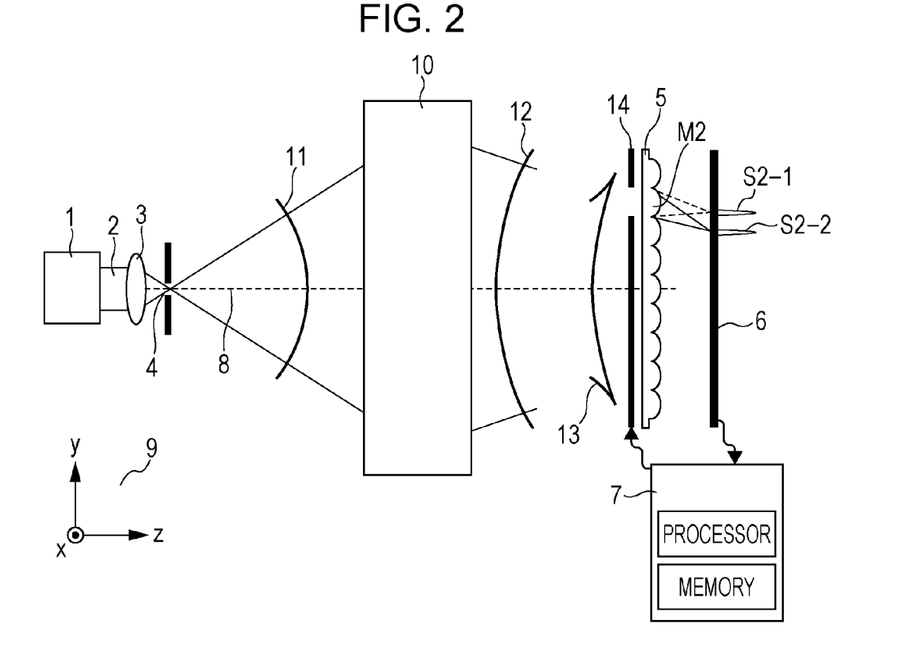
FIG. 2 is an explanatory illustration of a spot image when a wavefront having a fold is incident on a lenslet array.

In FIG. 2, a spot image is formed only with the light transmitted through the lenslet M2. If the wavefront aberration of the test optical system 10 is large, when the transmitted wavefront 12 of aspherical waves propagates, a fold may be generated at an edge portion. A fold of a wavefront is generated because, when a wavefront of light rays transmitted through an optical system propagates, a light ray transmitted through a position near the optical axis of the optical system and a light ray transmitted through a peripheral portion intersect with each other in an area between the optical system and a light receiving surface of the light receiving element.

If the fold is generated at the edge portion of the transmitted wavefront 13, when the transmitted wavefront 13 is incident on the lenslet array 5, double wavefronts with different shapes are incident on the lenslet M2, and spot images S2-1 and S2-2 are formed on the light receiving element 6.

A lenslet Mk, which can transmit light, is determined by controlling opening and closing of an aperture forming the aperture array 14. Then, the position of a spot image on the light receiving element 6 is measured. Accordingly, the spot image formed with the light transmitted through the lenslet Mk can be easily specified. At this time, the correspondence between the lenslet forming the lenslet array 5 and the spot image formed on the light receiving element 6 is clear. The aperture array 14 is controlled by a control unit in a central processing unit (CPU) 7. Further, a calculation unit in the CPU 7 acquires position information of the spot image based on the output from the light receiving element 6, and reproduces the transmitted wavefront 12 of the test optical system 10 based on the position information. In FIGS. 1 and 2, the z axis is set in the optical-axis direction, and the x axis and y axis are set as indicated by reference sign 9.

Figure 3A:
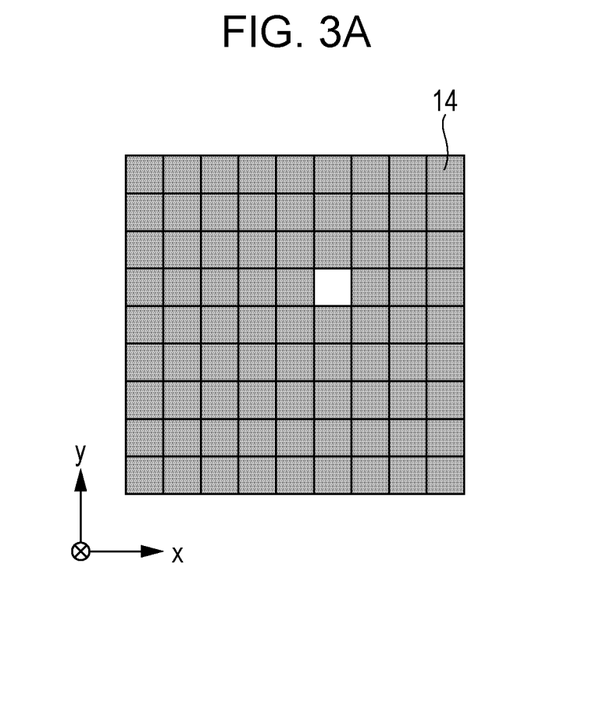
FIGS. 3A and 3B are illustrations explaining the relationship between an opening pattern of an aperture array and formation of a spot image.
Figure 3B:
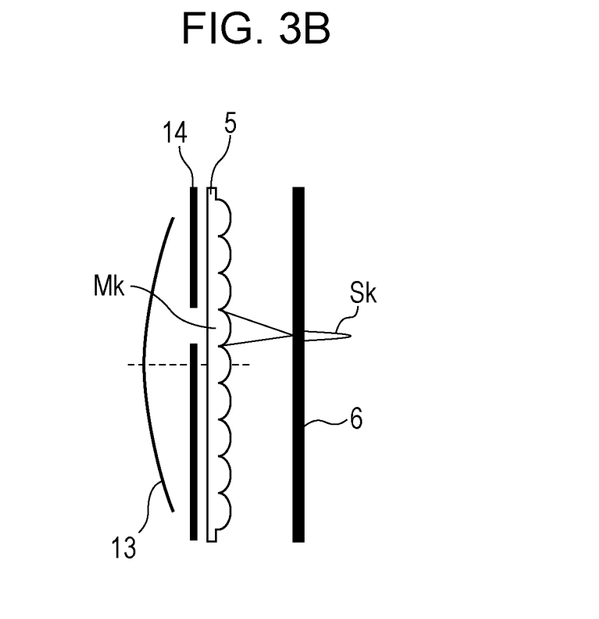

FIGS. 3A and 3B illustrate a correspondence between an opening pattern of an aperture in the xy plane of the aperture array 14 and a spot image formed on the light receiving element 6. FIG. 3A illustrates the opening pattern of the aperture in the xy plane of the aperture array 14. FIG. 3B illustrates the relationship among the aperture array 14, the lenslet array 5, and the light receiving element 6 in the process of forming a spot image. In this case, the opening position of the aperture array 14 is set so that only the lenslet Mk of the lenslet array 5 can transmit light.

By controlling opening and closing of the aperture as described above, a clear spot image Sk can be obtained without an influence by interference as shown in FIG. 1. Accordingly, since the position of the spot image can be accurately measured, the wavefront aberration can be further accurately measured as compared with measurement of related art.

By controlling opening and closing of each aperture corresponding to a lenslet forming the lenslet array 5, even if a fold is generated at a wavefront as shown in FIG. 2, it can be easily specified that the spot images S2-1 and S2-2 are formed by the wavefront transmitted through the lenslet M2.

Figure 4:
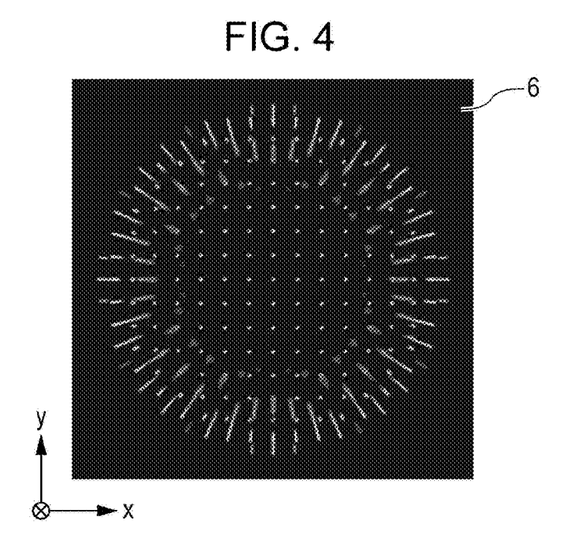
FIG. 4 is an explanatory illustration of spot images formed on a light receiving element.

FIG. 4 illustrates a light intensity distribution on the light receiving element 6 when spot images are measured without the aperture array 14. Although clear spot images can be obtained in a center portion of the light receiving element 6, spot images may be largely deformed or spot images may be blurred in a peripheral portion. This phenomenon is caused by interference between light transmitted through a specific lenslet and light transmitted through a lenslet adjacent to the specific lenslet, and interference between wavefronts being incident on the specific lenslet and having different shapes when a fold is generated at a wavefront.

Figure 5A:
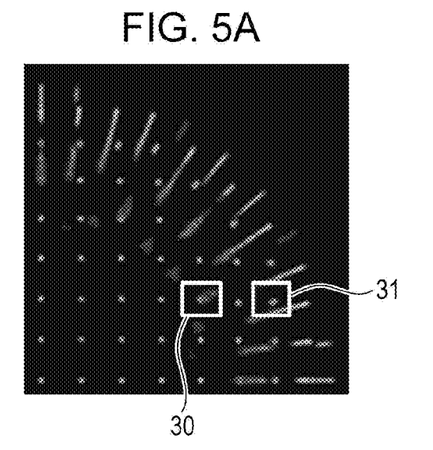
FIGS. 5A to 5C are explanatory illustrations of spot images formed in a peripheral portion of the light receiving element.

FIG. 5A is an enlarged view of part of FIG. 4. A spot image at the center of a rectangle 30 has a blur. A spot image is present at the center of a rectangle 31, and also, a neighboring spot image, which is deformed, appears in the rectangle 31.

Figure 5B:
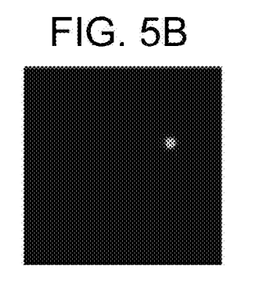
Figure 5C:
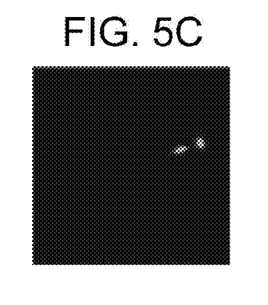

FIGS. 5B and 5C illustrate the results of measurement for spot images by controlling opening and closing of the aperture array 14. In FIG. 5B, the clear spot image without a blur is obtained. In FIG. 5C, the neighboring spot image becomes not visible, and the spot image, which has not been visible by the influence of interference, can be clearly recognized.

By repeating measurement on position information of a spot image while the opening position of the aperture array 14 is changed, the position information of the spot image formed by the wavefront being incident on each lenslet can be accurately acquired. By performing measurement on a spot image for each of the openings of the aperture array 14, interference between a wavefront transmitted through a specific lenslet forming the lenslet array 5 and a wavefront transmitted through another lenslet can be prevented.

When a fold is generated at the transmitted wavefront 13, wavefronts having different shapes are incident on a single lenslet. Hence, a plurality of spot images may be generated with the light transmitted through the single lenslet. Even in this case, by performing measurement on a spot image for each of the openings of the aperture array 14, correspondence between a specific lenslet forming the lenslet array 5 and a spot image can be easily specified.

Second Embodiment

In the first embodiment, the method of controlling opening and closing of each aperture corresponding to a lenslet forming the lenslet array 5 by using the aperture array 14 has been provided. In a second embodiment, a method of controlling the aperture array 14, which can markedly decrease the time for measurement, is described.

In the first embodiment, a spot image for each lenslet is measured to prevent interference between light transmitted through a specific lenslet and light transmitted through a lenslet other than the specific lenslet. If interference occurs, the interference influences formation of a spot image, and measurement accuracy for a wavefront aberration is decreased. That is, if the influence by the interference of light applied to the formation of a spot image is small, a plurality of spot images formed with light transmitted through a plurality of lenslets can be simultaneously measured.

In the peripheral portion separated from the optical axis 8, the influence by the interference of light is large. In a portion near the optical axis 8, the influence by the interference of light is small. Hence, the aperture array 14 is divided into a plurality of regions, and the method of controlling opening and closing an aperture is changed for each region. Accordingly, a spot image can be quickly and correctly measured.

Therefore, the aperture array is divided into a plurality of regions, and position information of a spot image is measured by using a control method which is different for each region. Specific control methods are described with reference to FIGS. 6A to 6D. The aperture array 14 in FIGS. 6A to 6D is arranged so that the center of the aperture array 14 is located on the optical axis 8 of the wavefront aberration measuring device shown in FIGS. 1 and 2.

Figure 6A:
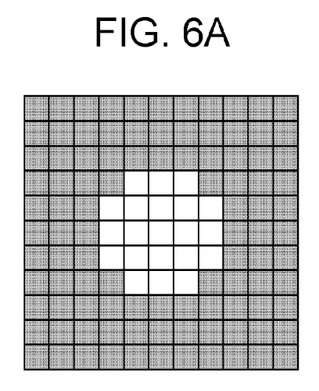
FIGS. 6A to 6D are explanatory illustrations of control methods of the aperture array.

First, a region near the center of the aperture array 14 is determined as a first region, and is controlled to be in a state in which apertures present in the first region can transmit light as shown in FIG. 6A. Then, spot images formed by a wavefront transmitted through the first region are collectively measured. Since the influence by the interference between wavefronts is small at a position near the optical axis, even if the spot images are collectively measured in this way, the measurement accuracy for position information of the spot images is hardly decreased.

Figure 6B:
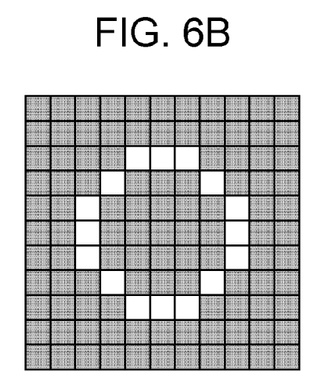
Figure 6C:
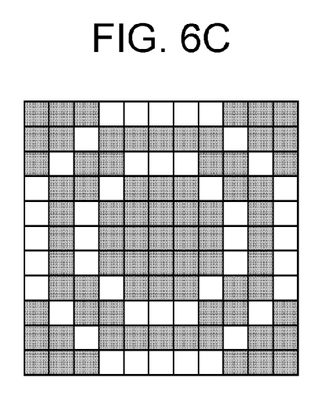

Then, a region outside the first region is determined as a second region, control for the aperture array 14, the control which is different from the control of the first region, is performed, and spot images are measured. In FIGS. 6B and 6C, apertures concentrically arranged around the center portion of the aperture array 14 are controlled to be in a state in which the apertures can transmit light. The second region is more likely influenced by the interference between wavefronts as compared with the first region. In particular, a wavefront transmitted through an aperture, which is adjacent to the center portion of the aperture array 14 in the radial direction, is largely influenced by the interference, and the large influence may result in a decrease in measurement accuracy for spot images. Owing to this, as shown in FIGS. 6B and 6C, a lenslet that blocks light to be transmitted and a lenslet that transmits light are alternately arranged from the center of the lenslet array toward an outer circumferential portion of the lenslet array. As described above, the spot images in the second region are collectively measured as long as apertures, which are adjacent in the radial direction, do not simultaneously transmit light.

Figure 6D:
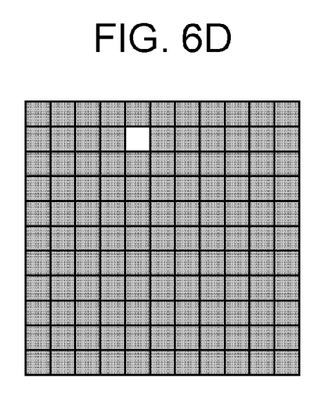

Alternatively, as shown in FIG. 6D, an aperture may be controlled in a state in which the aperture can transmit light in the second region, and a spot image may be measured for each lenslet.

As described above, by selectively using the control methods for the apertures depending on the positions of the apertures in the aperture array 14, information about a spot image required for measuring a wavefront aberration can be quickly obtained.

Calculation of Wavefront Aberration

Next, a method of calculating a wavefront aberration of the test optical system 10 based on measured spot images is described.

Since the test optical system 10 such as a lens for a camera cannot be manufactured by directly reproducing design values, the test optical system 10 has an optical characteristic different from the optical characteristic of an ideal test optical system (a reference test optical system) having the same optical characteristic as the optical characteristic provided by the design values. Now, a shift of the shape of the test optical system 10 from the shape of the reference test optical system is defined as a shape error. Also, when the test optical system 10 is installed on a measuring device, decentration and inclination may occur with respect to a predetermined reference position at which the reference test optical system is installed. The decentration and inclination may influence the shape of the wavefront transmitted through the test optical system 10. The influence is defined as an arrangement error. The arrangement error and the shape error are calculated by ray tracing (described later). That is, a wavefront aberration of the test optical system 10 is calculated with regard to the optical characteristic of the reference test optical system and a change in wavefront aberration caused by the shape error and the arrangement error.

Figure 7:
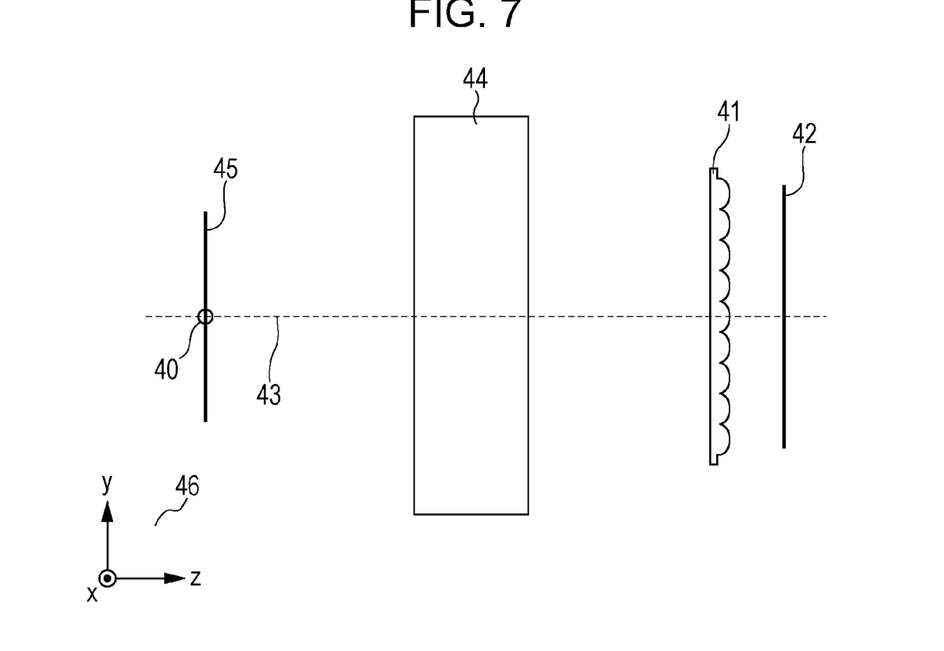
FIG. 7 is an explanatory illustration of an optical model used for ray tracing.

FIG. 7 is an optical model for imaginarily reproducing a wavefront aberration measuring device shown in FIG. 1. A point light source 40 is set at the position of the pinhole 4, a test optical system model 44 is reproduced as the test optical system 10, and a lenslet array model 41 is reproduced as the lenslet array 5. An image plane 42 is set at the position of the light receiving element 6. A spot image is formed on the image plane 42. An object plane 45 is defined as a plane, which includes the point light source 40 and is perpendicular to the optical axis 43. In FIGS. 7 to 13, the z axis is set in the optical-axis direction, and the x axis and y axis are set as indicated by reference sign 46.

A lenslet array model 41 is reproduced as the lenslet array 5 having a known optical characteristic. Individual lenslet models are expressed (as M1, M2, . . . , Mk, . . . ). The test optical system model 44 is a model in which a parameter that expresses the influence of the shape error and the arrangement error is introduced to the optical characteristic of the reference test optical system.

In this embodiment, an imaginary light source is set on the image plane 42, and light rays are traced toward an image point imaginarily set on the object plane 45. Since ray tracing is performed from the image plane toward the object plane while the light source is imaginarily set on the image plane 42 and the image point is imaginarily set on the object plane 45 in the original wavefront aberration measuring device, this method of ray tracing is described as backward ray tracing.

Figure 8:
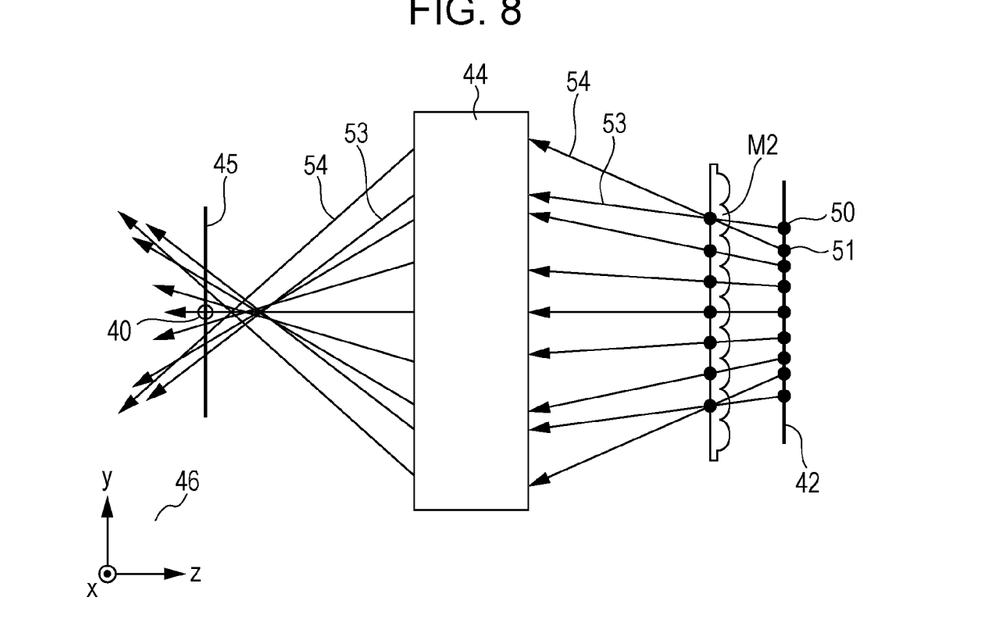
FIG. 8 is an illustration showing a method of ray tracing.

A specific process of the backward ray tracing is described below. FIG. 8 is an illustration explaining an overview of the backward ray tracing of the disclosure. First, an imaginary light source is set at a position on the image plane 42 of the optical model, corresponding to the actually measured position of the spot image on the light receiving element.

According to this embodiment, in the optical model, light rays 53 and 54, which start from an imaginary light source as the starting point, pass through the center of the exit pupil of the lenslet, and are incident on the test optical system model 44, are set. Then, ray tracing is performed on the light rays 53 and 54 transmitted through the test optical system model 44. In this embodiment, ray tracing based on geometrical optics is performed; however, tracing based on wave optics may be performed. In the following description, the ray tracing based on geometrical optics is basically performed to decrease the time required for the ray tracing.

In this embodiment, the backward ray tracing is performed. However, ray tracing may be performed from an actual point light source 40 as the starting point toward the light receiving element 6.

In FIG. 8, if the shape error and the arrangement error are correctly set as the test optical system model 44, a light ray emitted from the point light source 40 and passing through the lenslet M2 intersects with the image plane 42 at the positions of imaginary light sources 50 and 51. In contrast, a light ray traced from the imaginary light sources 50 and 51 as the starting points toward the lenslet M2 intersect with the object plane 45 at the position of the point light source 40.

If the light ray does not pass through the position of the point light source 40 as the result of the backward ray tracing, the reason is that the shape error and the arrangement error of the test optical system model 44 are not correctly modeled. If the shape error and the arrangement error are correctly set, the light ray passes through the point light source 40 on the object plane 45.

In this embodiment, the shape error and the arrangement error are set as parameters, and the values of the parameters are changed so that all light rays shown in FIG. 8 converge at the point light source 40. The process of changing the values of the parameters is called optimization for optical paths. If the optimization is attained, the light rays are collected at the point light source 40. In the ray tracing of the disclosure, the shape error and the arrangement error may be set as different parameters. Hence, the arrangement error of the test optical system 10 can be eliminated, and the wavefront aberration of the test optical system 10 can be accurately measured.

Figure 9:
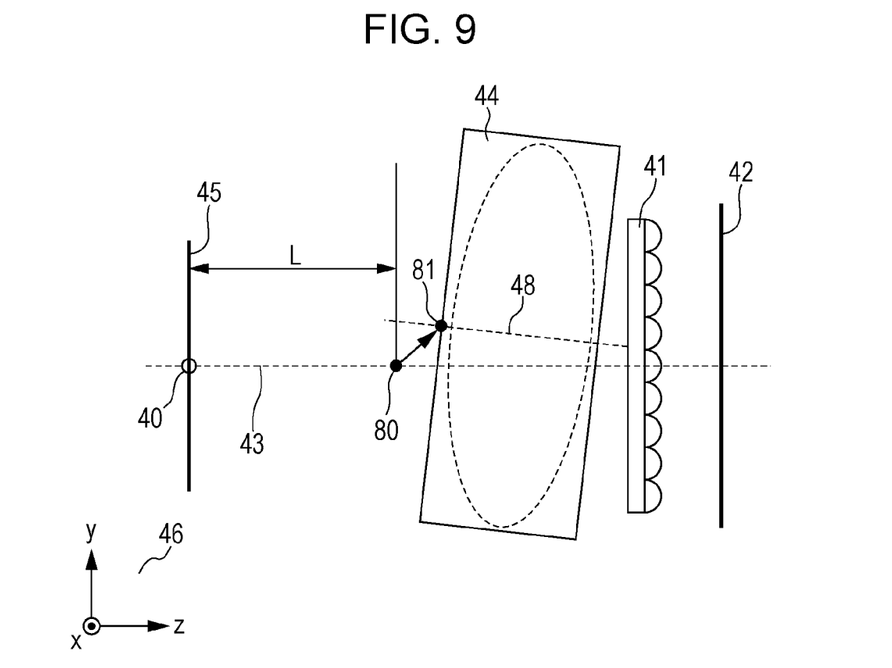
FIG. 9 is an explanatory illustration of an arrangement error of a test optical system.

First, a method of setting a parameter expressing an arrangement error is described with reference to FIG. 9. In a state in which a shape error is not present, the test optical system model 44 has rotational symmetry with respect to a symmetry axis 48. A point 80 is defined as a point separated from the point light source 40 by a predetermined distance L on the optical axis 43, and a point 81 is defined on the symmetry axis 48. On the precondition that the point 80 is aligned with the point 81 when the arrangement error is not present, the arrangement error can be expressed by 5 parameters as follows. To be more specific, it is assumed that $\Delta x$, $\Delta y$, and $\Delta z$ are respectively displacement amounts of the point 81 in the x-axis, y-axis, and z-axis directions with reference to the point 80. Also, it is assumed that $\Delta \phi x$ is a rotation amount around the x-axis, and $\Delta \phi y$ is a rotation amount around the y-axis from the point 80 toward the point 81.

Figure 10:
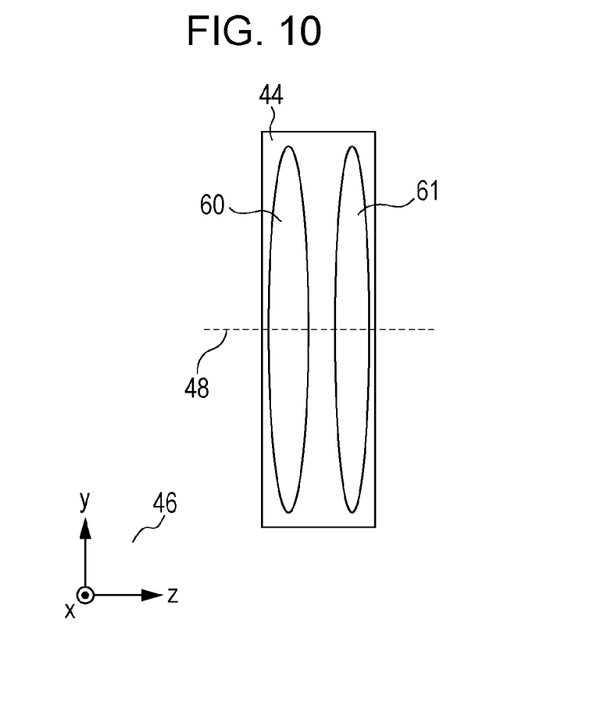
FIG. 10 is an illustration showing a configuration of a test optical system if a shape error is not present.

Next, a method of setting a parameter expressing a shape error of the test optical system 10 is described. FIG. 10 is a cross-sectional view on the yz plane of the test optical system model 44 that reflects the configuration of the test optical system 10. The test optical system 10 is typically formed of a plurality of lens elements. Each element has, for example, a processing error, a decentration error of decentration with respect to the symmetry axis 48, and an inclination error of inclination with respect to the symmetry axis 48. With these errors, the optical characteristic of the test optical system 10 is shifted from the optical characteristic of the reference test optical system.

FIG. 10 is a schematic illustration when the reference test optical system is formed of two lens elements 60 and 61. A state is illustrated, in which the lens elements 60 and 61 are separated from each other by a predetermined distance on the central symmetry axis 48.

Figure 11A:
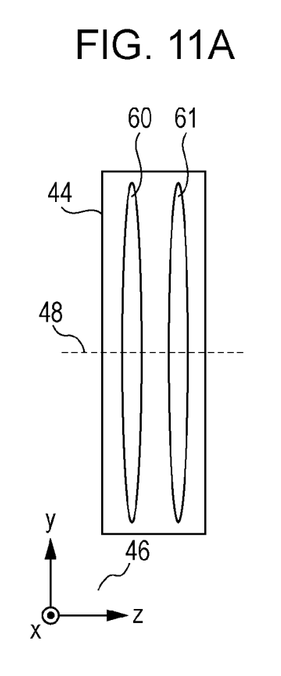
FIGS. 11A to 11C are explanatory illustrations of shape errors of test optical systems.
Figure 11B:
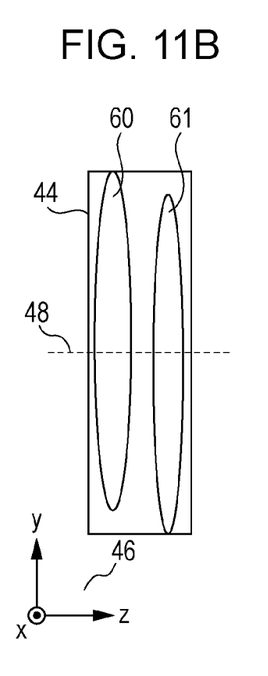
Figure 11C:
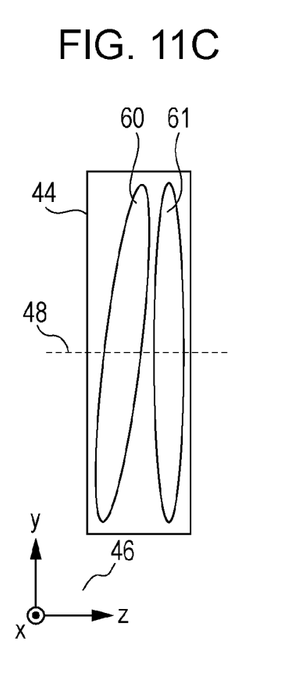

FIGS. 11A to 11C illustrate typical models that express shape errors. FIG. 11A illustrates a state in which the optical characteristics of the lens elements 60 and 61 are different from the design optical characteristic, and have processing errors. FIG. 11B illustrates a state in which the lens elements 60 and 61 have decentration errors. FIG. 11C illustrates a state in which the lens elements 60 and 61 have inclination errors. In this way, the shape error of the test optical system 10 may be expressed by the processing error, the decentration error, and the inclination error.

Figure 12:
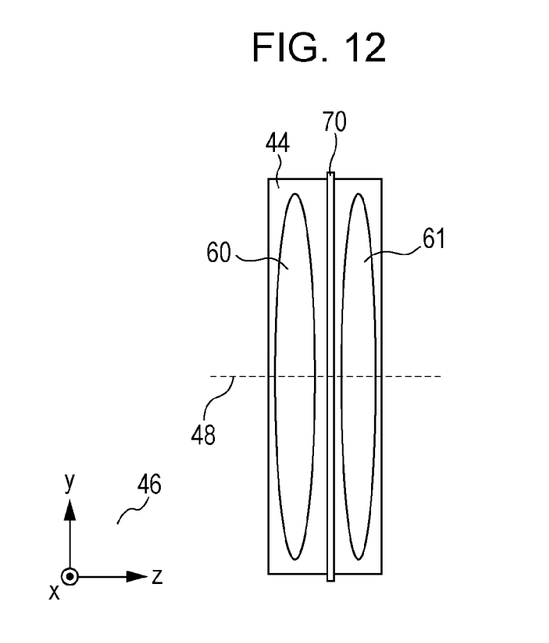
FIG. 12 is an illustration showing a method of expressing a shape error by using a dummy element.

In the disclosure, the shape errors shown in FIGS. 11A to 11C are collectively expressed by using a dummy element. In FIG. 12, it is assumed that the lens elements 60 and 61 are processed and manufactured according to the design and do not have a decentration error or an inclination error. Reference sign 70 denotes a dummy element with an assumption that the thickness is zero. The dummy element provides an imaginary change in wavefront to a light ray transmitted through the test optical system model 44. The entire influence of the shape error is expressed as a change in wavefront added by the dummy element 70.

A change in shape of a wavefront is expressed by using the Fringe Zernike polynomial. To be more specific, a change in shape of a wavefront is expressed by expansions of terms including first to sixteenth terms as indicated in Table 1. In this case, if coefficients (Zernike coefficients) corresponding to the respective terms are Zj (j: 1 to 16), the influence of shape error in the test optical system model 44 can be expressed by 16 parameters. If a shape error is not present, the value of the Zernike coefficient of each term becomes zero. The shape error can be accurately estimated through a simulation using the dummy element 70 except for a case in which the shape error is extremely large. In this case, the Fringe Zernike polynomial expressing the shape error is not limited to the polynomial including the sixteen terms, and may be expressed by expansions with lower-order terms or higher-order terms.

A method of estimating a shape error and an arrangement error of the test optical system 10 by using the test optical system model 44 is described below. The influence of an arrangement error is expressed by 5 parameters ($\Delta x$, $\Delta y$, $\Delta z$, $\Delta \phi x$, $\Delta \phi y$), and the influence of a shape error is expressed by 16 variables (Zernike coefficients) Zj.

Calculations for providing the optimization for optical paths, known optical design software may be applied. For example, in FIG. 8, the position at which the light rays 53 and 54 intersect with the object plane 45 is expressed as a coordinate ($x_k$, $y_k$, 0), and a cost function is defined by Expression (1) as follows:

$$\sum_k [(x_k)^2 + (y_k)^2], \quad (1)$$

where a subscript k corresponds to a character k when Rk is an imaginary light source on the image plane 42, and the results of light rays starting from imaginary light sources on the image plane 42 are added. The added numerical value is minimized to provide the optimization. An example of such a calculation method may be a damped least square (DLS) method.

Figure 13:
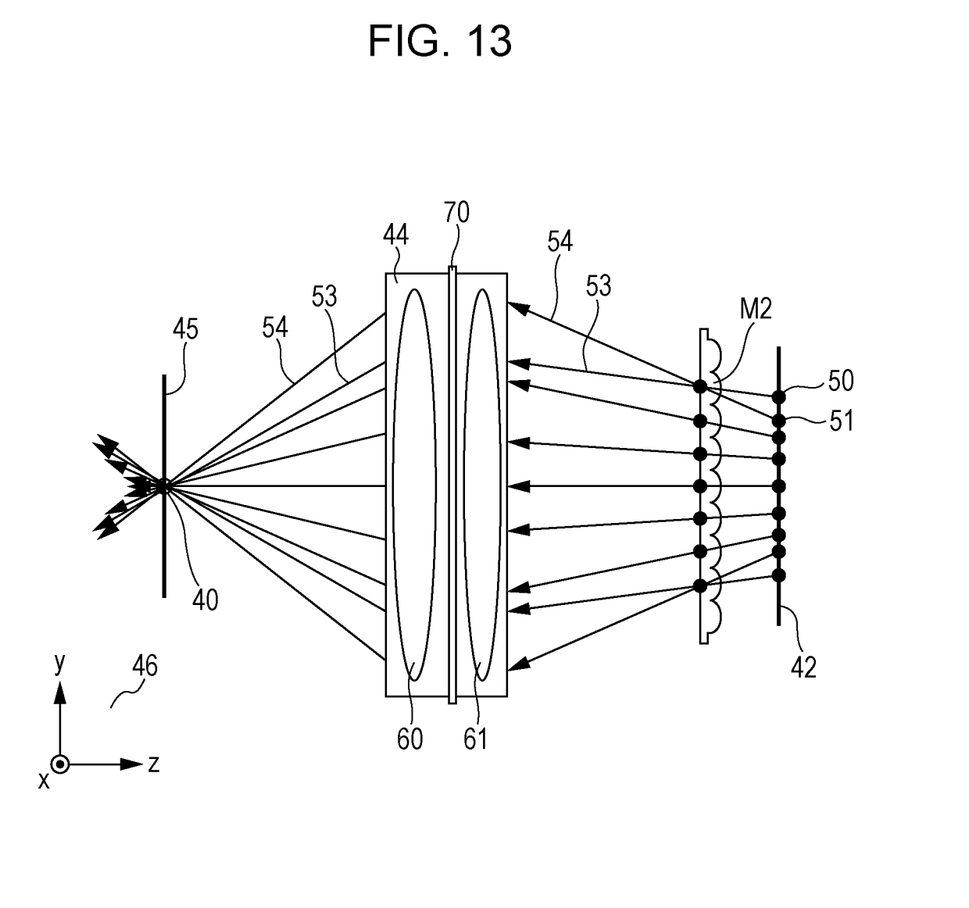
FIG. 13 is an illustration showing a state after optimization by backward ray tracing.

FIG. 13 illustrates the loci of the light rays after the optimization is attained. At this time, the Zernike coefficients indicative of the shape error of the test optical system 10, and the values of the parameters ($\Delta x$, $\Delta y$, $\Delta z$, $\Delta \phi x$, $\Delta \phi y$) indicative of the arrangement error of the test optical system 10 are values when the optimization is attained. Hence, a shape error component can be obtained. By using this, the transmitted wavefront of the test optical system 10 regarding the influence of the shape error can be reproduced.

TABLE 1

| Term No. | Expansion |
|---|---|
| 1 | 1 |
| 2 | $r\cos\theta$ |
| 3 | $r\sin\theta$ |
| 4 | $2r^2 - 1$ |
| 5 | $r^2\cos2\theta$ |
| 6 | $r^2\sin2\theta$ |
| 7 | $(3r^3 - 2r)\cos\theta$ |
| 8 | $(3r^3 - 3r)\sin\theta$ |
| 9 | $6r^4 - 6r^2 + 1$ |
| 10 | $r^3\cos3\theta$ |
| 11 | $r^3\sin3\theta$ |
| 12 | $(4r^4 - 3r^2)\cos2\theta$ |
| 13 | $(4r^4 - 3r^2)\sin2\theta$ |
| 14 | $(10r^5 - 12r^3 + 3r)\cos\theta$ |
| 15 | $(10r^5 - 12r^3 + 3r)\sin\theta$ |
| 16 | $20r^6 - 30r^4 + 12r^2 - 1$ |

The CPU 7 stores a computer program that executes the above-described measurement and calculation.

Further, the above-described wavefront aberration measuring method can be applied to evaluation for an optical characteristic of an optical system. That is, by using a wavefront aberration measuring method of the disclosure after an optical system is assembled, it can be checked whether or not the assembled optical system has a predetermined optical characteristic.

Also, in any of the above-described embodiments, the position of the light source is arranged at a side opposite to the light receiving element with respect to the test optical system, and is at a limited distance from the test optical system. However, the arrangement is not limited thereto. For example, if parallel light rays are incident on the test optical system, the light source may be arranged at a position separated from the test optical system by an infinite distance.

Further, in any of the above-described embodiments, the test optical system has a positive power. However, the disclosure may be similarly applied even to a test optical system having a negative power. If a test optical system has a negative power, convergent light is required for an incident wavefront. The light source is arranged close to the light receiving element with respect to the test optical system.

Other Embodiments

Aspects of the present disclosure can also be realized by a computer of a system or apparatus (or devices such as a CPU, a micro processing unit (MPU), or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2012-253307 filed Nov. 19, 2012, which is hereby incorporated by reference herein in its entirety.

What is claimed is:

1. A wavefront aberration measuring method comprising:
   measuring a wavefront aberration of a test optical system, by causing light, which is emitted from a light source and transmitted through the test optical system, to be incident on a lenslet array;
   forming a spot image with light from transmitting through at least one lenslet included in the lenslet array;
   blocking light from being transmitted through at least one other lenslet included in the lenslet array;
   measuring a position of the spot image;
   calculating optical paths from positions of a plurality of spot images toward the light source;
   specifying parameters of the test optical system when light rays from the positions of the plurality of spot images converge at the light source; and
   calculating a wavefront aberration of the test optical system corresponding to the parameters of the test optical system.

2. The wavefront aberration measuring method according to claim 1, wherein,
   in a case of measuring the positions of the plurality of spot images formed with light from transmitting through lenslets arranged in a first region, which is a center portion of the lenslet array, the positions of the plurality of spot images are measured without blocking light from being transmitted through a plurality of lenslets arranged in the first region; and
   in a case of measuring the positions of the plurality of spot images formed with light from transmitting through at least one lenslet arranged in a second region, which is outside the first region, the positions of the plurality of spot images are measured with blocking light from being transmitting through at least one other lenslet arranged in the second region.

3. The wavefront aberration measuring method according to claim 1,
   wherein, in the calculating a wavefront aberration of the test optical system, while a shape error and an arrangement error of the test optical system with respect to a reference test optical system having a predetermined shape and arranged at a predetermined position serve as variables, the wavefront aberration of the test optical system is calculated by tracing light rays from the positions of the spot images toward the light source that emits light, which is incident on the test optical system, and determining the shape error of the test optical system when the light rays from the spot images converge at the light source.

4. The wavefront aberration measuring method according to claim 1, wherein, a position of a spot image formed only with light from transmitting through a single lenslet of the lenslet array is measured.

5. The wavefront aberration measuring method according to claim 1, wherein, positions of spot images formed with light from transmitting through lenslets, which are arranged in a circular form and included in the lenslet array, are measured.

6. The wavefront aberration measuring method according to claim 4, wherein, the position of the spot image formed only with light from transmitting through the single lenslet of the lenslet array is measured, while the lenslet, through which light which forms a spot image is transmitted, is changed among the lenslets included in the lenslet array.

7. The wavefront aberration measuring method according to claim 5, wherein, the positions of the spot images formed with light from transmitting through lenslets are measured, while the lenslets, through which light which form spot images are transmitted, are changed among the lenslets arranged in the circular form and included in the lenslet array.

8. A method of manufacturing an optical system, the method comprising a step of evaluating an optical characteristic of an optical system by using a wavefront aberration measuring method comprising:
   measuring a wavefront aberration of a test optical system, by causing light, which is emitted from a light source and transmitted through the test optical system, to be incident on a lenslet array;
   forming a spot image with light from transmitting through at least one lenslet included in the lenslet array;
   blocking light from being transmitted through at least one other lenslet included in the lenslet array;
   measuring a position of the spot image;
   calculating optical paths from positions of a plurality of spot images toward the light source;
   specifying parameters of the test optical system when light rays from the positions of the plurality of spot images converge at the light source; and
calculating a wavefront aberration of the test optical system corresponding to the parameters of the test optical system.

9. A wavefront aberration measuring apparatus, comprising:
   a light source;
   a lenslet array on which light, which is emitted from the light source and transmitted through a test optical system, is incident;
   a memory for storing data and a computer program; and
   a processor coupled to the memory for executing the computer program, the computer program comprising instructions for:
   forming a spot image with light from transmitting through at least one lenslet included in the lenslet array;
   blocking light from being transmitted through at least one other lenslet included in the lenslet array;
   measuring a position of the spot image;
   calculating optical paths from positions of a plurality of spot images toward the light source;
   specifying parameters of the test optical system when light rays from the positions of the plurality of spot images converge at the light source; and
   calculating a wavefront aberration of the test optical system corresponding to the parameters of the test optical system.

10. The wavefront aberration measuring device according to claim 9, further comprising a light receiver configured to receive light transmitted through the lenslet array, wherein an aperture array is arranged between the test optical system and the lenslet array, or between the lenslet array and the light receiver.

11. A non-transitory recording medium storing a program for causing a wavefront aberration measuring apparatus to execute a method, the method comprising:
   a measuring step of causing light, which is emitted from a light source and transmitted through a test optical system, to be incident on a lenslet array, forming a spot image with light from transmitting through at least one lenslet included in the lenslet array with blocking light from being transmitted through at least one other lenslet included in the lenslet array, and measuring a position of the spot image; and
   a calculating step of calculating optical paths from positions of a plurality of spot images toward the light source, specifying parameters of the test optical system when light rays from the positions of the plurality of spot images converge at the light source, and calculating a wavefront aberration of the test optical system corresponding to the parameters of the test optical system.

12. The non-transitory recording medium according to claim 11,
wherein the wavefront aberration measuring apparatus includes an aperture array having a plurality of apertures arranged therein, and
wherein, in the measuring step, the light from transmitting through the lenslet of the lenslet array is blocked by controlling transmission state of light, which is incident on each aperture.

13. A wavefront aberration measuring method comprising:
measuring a wavefront aberration of a test optical system, by causing light, which is emitted from a light source and transmitted through the test optical system, to be incident on a lenslet array;
forming a spot image with light from transmitting through at least one lenslet included in the lenslet array;
blocking light from being transmitted through at least one other lenslet included in the lenslet array;
measuring a position of the spot image;
calculating optical paths from the light source toward positions of a plurality of spot images;
specifying parameters of the test optical system when light rays from the light source converge at the positions of the plurality of spot images; and
calculating a wavefront aberration of the test optical system corresponding to the parameters of the test optical system.

14. A method of manufacturing an optical system, the method comprising a step of evaluating an optical characteristic of an optical system by using a wavefront aberration measuring method comprising:
measuring a wavefront aberration of a test optical system, by causing light, which is emitted from a light source and transmitted through the test optical system, to be incident on a lenslet array;
forming a spot image with light from transmitting through at least one lenslet included in the lenslet array;
blocking light from being transmitted through at least one other lenslet included in the lenslet array;
measuring a position of the spot image;
calculating optical paths from the light source toward positions of a plurality of spot images;
specifying parameters of the test optical system when light rays from the light source converge at the positions of the plurality of spot images; and
calculating a wavefront aberration of the test optical system corresponding to the parameters of the test optical system.

15. A wavefront aberration measuring apparatus, comprising:
a light source;
a lenslet array on which light, which is emitted from the light source and transmitted through a test optical system, is incident;
a memory for storing data and a computer program; and
a processor coupled to the memory for executing the computer program, the computer program comprising instructions for:
forming a spot image with light from transmitting through at least one lenslet included in the lenslet array;
blocking light from being transmitted through at least one other lenslet included in the lenslet array;
measuring a position of the spot image;
calculating optical paths from the light source toward positions of a plurality of spot images;
specifying parameters of the test optical system when light rays from the light source converge at the positions of the plurality of spot images; and
calculating a wavefront aberration of the test optical system corresponding to the parameters of the test optical system.

16. A non-transitory recording medium storing a program for causing a wavefront aberration measuring apparatus to execute a method, the method comprising:
a measuring step of causing light, which is emitted from a light source and transmitted through a test optical system, to be incident on a lenslet array, forming a spot image with light from transmitting through at least one lenslet included in the lenslet array with blocking light from being transmitted through at least one other lenslet included in the lenslet array, and measuring a position of the spot image; and
a calculating step of calculating optical paths from the light source toward positions of a plurality of spot images, specifying parameters of the test optical system when light rays from the light source converge at the positions of the plurality of spot images, and calculating a wavefront aberration of the test optical system corresponding to the parameters of the test optical system.

* * * * *